United States Patent
Jamart et al.

(10) Patent No.: US 12,257,809 B2
(45) Date of Patent: Mar. 25, 2025

(54) GLASS SHEET COATED WITH A STACK OF THIN LAYERS AND AN ENAMEL LAYER

(71) Applicant: SAINT-GOBAIN GLASS FRANCE, Courbevoie (FR)

(72) Inventors: Juliette Jamart, Compiegne (FR); Marion Lallement, Margny les Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 46 days.

(21) Appl. No.: 17/911,075

(22) PCT Filed: Mar. 10, 2021

(86) PCT No.: PCT/EP2021/055964
§ 371 (c)(1),
(2) Date: Sep. 12, 2022

(87) PCT Pub. No.: WO2021/180749
PCT Pub. Date: Sep. 16, 2021

(65) Prior Publication Data
US 2023/0134399 A1    May 4, 2023

(30) Foreign Application Priority Data
Mar. 13, 2020    (FR) ...................... 2002502

(51) Int. Cl.
*B32B 17/10*    (2006.01)
*B32B 7/12*    (2006.01)
*B32B 17/12*    (2006.01)

(52) U.S. Cl.
CPC .......... *B32B 17/10284* (2013.01); *B32B 7/12* (2013.01); *B32B 17/10036* (2013.01); *B32B 2255/205* (2013.01); *B32B 2307/202* (2013.01); *B32B 2307/4026* (2013.01); *B32B 2307/41* (2013.01); *B32B 2311/02* (2013.01); *B32B 2311/20* (2013.01); *B32B 2605/00* (2013.01)

(58) Field of Classification Search
CPC ................ B32B 7/12; B32B 17/10036; B32B 17/10284; B32B 2255/205; B32B 2307/202; B32B 2307/4026; B32B 2307/41; B32B 2311/02; B32B 2311/20; B32B 2605/00; B60J 1/001; B60J 1/002; B60J 1/003; B60J 1/02; B60J 7/00; C03C 3/066; C03C 8/00; C03C 8/04; C03C 8/14; C03C 8/16; C03C 8/20; C03C 17/3411; C03C 17/3435; C03C 17/3636; C03C 17/3639; C03C 17/3642; C03C 17/3644; C03C 17/3649; C03C 17/3652; C03C 17/3655; C03C 17/3657; C03C 17/366; C03C 17/3681; C03C 2218/119; C03C 2218/154; C03C 2219/156

See application file for complete search history.

(56) References Cited

U.S. PATENT DOCUMENTS

| | | | | |
|---|---|---|---|---|
| 9,475,726 | B2 * | 10/2016 | Savary | C03C 17/002 |
| 11,192,821 | B2 * | 12/2021 | Jamart | C03C 17/3681 |
| 11,427,501 | B2 * | 8/2022 | Maria | C03C 17/3411 |
| 2006/0188730 | A1 * | 8/2006 | Varanasi | C03C 17/3452 |
| | | | | 428/432 |
| 2015/0299025 | A1 * | 10/2015 | Brown | C03B 19/06 |
| | | | | 428/428 |
| 2016/0185657 | A1 * | 6/2016 | Sakoske | C03C 8/20 |
| | | | | 428/428 |
| 2016/0214887 | A1 * | 7/2016 | Illy | C03C 17/3686 |

FOREIGN PATENT DOCUMENTS

| | | | | |
|---|---|---|---|---|
| DE | 102017223680 A1 * | 6/2019 | | B05D 5/083 |
| EP | 0 419 321 A1 | 3/1991 | | |
| EP | 962429 A1 * | 12/1999 | | C03C 17/36 |
| WO | WO 2012/172269 A1 | 12/2012 | | |
| WO | WO 2014/093568 A1 | 6/2014 | | |
| WO | WO 2014/133929 A2 | 9/2014 | | |
| WO | WO 2019/106264 A1 | 6/2019 | | |
| WO | WO 2019/243755 A1 | 12/2019 | | |

OTHER PUBLICATIONS

International Search Report as issued in International Patent Application No. PCT/EP2021/055964, dated Apr. 6, 2021.

* cited by examiner

*Primary Examiner* — Humera N. Sheikh
*Assistant Examiner* — Kevin C T Li
(74) *Attorney, Agent, or Firm* — Pillsbury Winthrop Shaw Pittman LLP

(57) ABSTRACT

A material includes a glass sheet coated on at least part of one of the faces thereof with a stack of thin layers, the stack of thin layers being coated on at least part of the surface thereof with an enamel layer not including bismuth, the enamel layer being coated with a non-stick layer.

19 Claims, No Drawings

GLASS SHEET COATED WITH A STACK OF THIN LAYERS AND AN ENAMEL LAYER

CROSS-REFERENCE TO RELATED APPLICATIONS

This application is the U.S. National Stage of PCT/EP2021/055964, filed Mar. 10, 2021, which in turn claims priority to French patent application number 2002502 filed Mar. 13, 2020. The content of these applications are incorporated herein by reference in their entireties.

The invention relates to the field of materials comprising a glass sheet coated with a stack of thin layers and an enamel layer. Such materials are in particular intended to be incorporated into laminated bent glazings for motor vehicles, for example for roofs or windscreens.

Laminated glazings are glazings in which two glass sheets are adhesively bonded by means of a lamination interlayer. The latter makes it possible in particular to retain shards of glass in the event of breakage, but also provides other functions, in particular in terms of resistance to breaking and entering or improving acoustic properties.

These glazings often comprise coatings of various types, intended to confer different properties.

Enamel layers, generally black and opaque, are often deposited on part of the glazing, generally in the form of a peripheral strip intended to hide, and protect from ultraviolet radiation, the polymer seals serving for attaching and positioning the glazing on the vehicle body window opening. Enameled zones also hide the zones for attaching the interior rear-view mirror and various connectors and sensors.

In a laminated glazing, these layers of enamel are generally arranged on face 2, with the faces traditionally being numbered starting from the face intended to be positioned on the outside of the vehicle. Face 2 is therefore a face which is in contact with the lamination interlayer. The aesthetic appearance of the enamel layer, viewed from the outside of the vehicle, holds particular importance for car manufacturers. Enamel is generally obtained by firing a composition comprising a glass frit and pigments at above 500° C. A glass frit is composed of fine particles of glass with a low melting point which, under the effect of a firing heat treatment, softens and adheres to the glass sheet. This thus forms a generally opaque mineral layer with high chemical and mechanical resistance, which adheres perfectly to the glass, holding the pigment particles. The firing step is generally carried out simultaneously with the bending of the glass sheet.

In the context of manufacturing laminated glazing, the two glass sheets of the glazing are bent together, with the glass sheet intended to be positioned on the inside of the vehicle generally being arranged above the other glass sheet, which carries the enamel. It is then necessary for the enamel to have non-stick properties in order to prevent any bonding between the two glass sheets during the bending. To this end, enamels containing bismuth are usually employed, i.e. enamels obtained from glass frits containing bismuth oxide.

Coatings, generally in the form of stacks of thin layers, can also be present on one of the glass sheets of the laminated glazing. These may particularly be electrically conductive layers, which can provide two types of functions. Firstly, when current supplies are provided, electrically conductive layers can dissipate heat by the Joule effect. These are then heating layers, of use for example for defrosting or defogging. Secondly, due to their reflection of infrared radiation, these layers have solar control or low-emissivity properties. The layers are thus valued for the improvement in thermal comfort or for the energy savings they provide, by reducing the consumption intended for heating or air conditioning. These stacks of layers are generally arranged on face 3 of the laminated glazing, therefore also in contact with the lamination interlayer.

Nevertheless, in some cases which will be described in detail hereinafter, it may be beneficial to have the enamel layer and the stack of thin layers on the same glass sheet, and therefore on the same face of the glass sheet in question, in order for these coatings to be protected inside the laminated glazing.

However, it has been observed that, when a glass sheet coated with a stack of thin layers had to be provided with an enamel layer containing bismuth (therefore a non-stick layer), unwanted interactions occurred between the stack and the enamel during the bending, leading particularly to a degradation of the aesthetic appearance of the enamel. It has particularly been observed, when the stack contains at least one nitride layer, that bubbles were formed within the enamel, close to the interface between the latter and the stack, causing a significant lowering of the adhesion of the enamel, altering the optical appearance thereof (in particular the color on the glass side, i.e. on the side opposite the enamel) and reducing the chemical resistance thereof, in particular to acids.

Several solutions to this problem have been proposed.

It is possible to remove beforehand the stack of thin layers at the locations where the enamel layer is to be deposited, for example by means of abrasives, in order for the enamel to be deposited in direct contact with the glass sheet and to prevent any problems of adhesion between the enamel layer and the stack of thin layers. However, mechanical abrasion produces visible scratches, including on the enamel layer.

Application WO 2014/133929 proposes the concept of using, for the enamel, special glass frits which, during firing, are capable of dissolving the stack of thin layers to become directly attached to the glass. However, such methods are expensive.

The application WO 2019/106264 proposes modifying the stack of thin layers by adding a layer of oxide between the stack and the enamel comprising bismuth.

The aim of the invention is to propose a more simple and less expensive solution to the abovementioned problem.

To this end, a subject of the invention is a material comprising a glass sheet coated on at least part of one of the faces thereof with a stack of thin layers, said stack being coated on at least part of the surface thereof with an enamel layer not comprising bismuth, said enamel layer being coated with a non-stick layer.

Another subject of the invention is a method for obtaining a material according to the invention, comprising the following steps:
  providing a glass sheet coated on at least part of one of the faces thereof with a stack of thin layers, then
  a step of depositing, on at least part of the surface of the stack of thin layers, an enamel layer not comprising bismuth, then
  a step of depositing, on said enamel layer, a non-stick layer.

Another subject of the invention is a laminated bent glazing, particularly for a windscreen or roof of a motor vehicle, comprising a material according to the invention, adhesively bonded to an additional glass sheet by means of a lamination interlayer, such that the enamel layer and the stack of thin layers are facing said interlayer, particularly are on face 2 of the glazing.

Finally, a subject of the invention is a method for obtaining a laminated bent glazing as defined previously, comprising the following steps:
- providing a material according to the invention or obtained according to the method mentioned previously and an additional glass sheet, then
- a step of simultaneously bending the material and the additional glass sheet, then
- a step of laminating said material with the additional glass sheet, by means of a lamination interlayer, so that the enamel layer and the stack of thin layers are facing said interlayer.

Unlike what is proposed in the abovementioned application WO 2014/133929, the stack of thin layers is not degraded by the deposition of the enamel. The material according to the invention therefore has, superposed, a stack of thin layers then an enamel layer, the latter not being in contact with the glass sheet.

The use of an enamel layer not containing bismuth makes it possible to prevent any unwanted interaction during the bending, in particular with stacks of thin layers comprising at least one layer based on a nitride. Nonetheless, since these enamels do not make it possible to prevent bonding between the two glass sheets during the bending, a non-stick layer is arranged on the enamel layer.

"Non-stick" layer is intended to mean a layer which is able to prevent bonding of the two glass sheets during the bending.

The glass sheet may be flat or bent. The glass sheet is generally flat during the deposition of the stack of thin layers and then the enamel layer, and is then bent. The glass sheet is therefore normally flat in the material according to the invention (intermediate product) and bent in the bent laminated glazing according to the invention (finished product).

The glass is typically a soda-lime-silica glass, but other glasses, for example borosilicates or aluminosilicates, can also be used. The glass sheet is preferably obtained by the float method, i.e. by a method consisting in casting molten glass onto a bath of molten tin.

The glass sheet may be made of clear glass or tinted glass, preferably of tinted glass, for example green, gray or blue. To this end, the chemical composition of the glass sheet advantageously comprises iron oxide, in a content by weight ranging from 0.5 to 2%. It may also comprise other coloring agents, such as cobalt oxide, chromium oxide, nickel oxide, erbium oxide or else selenium.

The glass sheet preferably has a thickness within a range extending from 0.7 to 19 mm, particularly from 1 to 10 mm, in particular from 2 to 6 mm, or even from 2 to 4 mm.

The lateral dimensions of the glass sheet should be adapted based on those of the laminated glazing with which it is intended to be integrated. The glass sheet preferably has a surface area of at least 1 $m^2$.

The glass sheet is preferably coated with the stack of thin layers over at least 70%, particularly over at least 90%, or even over the whole of the surface of the face of the glass sheet. Indeed, some zones may not be coated in order particularly to fit communicating windows that allow waves to pass.

The stack is preferably coated with the enamel layer over 2 to 25%, particularly 3 to 20%, or even 5 to 15% of the surface thereof. The enamel layer preferably comprises a peripheral strip, i.e. a self-contained strip which, at any point of the periphery of the glass sheet, extends toward the inside of the glass sheet over a certain width, typically of between 1 and 20 cm.

The non-stick layer preferably coats the whole of the enamel layer. Advantageously, the non-stick layer only coats the enamel layer; it is therefore not present in zones not coated with the enamel layer.

The stack of thin layers is preferably in contact with the glass sheet. The enamel layer is preferably in contact with the stack of thin layers. The non-stick layer is preferably in contact with the enamel layer. In the present text, the stack of thin layers, the enamel layer and the non-stick layer are collectively called "the coatings". The material according to the invention preferably consists of these coatings.

In the present text, "contact" is intended to mean physical contact. The expression "based on" is preferably intended to mean the fact that the layer in question comprises at least 50% by weight of the material in question, particularly 60%, or even 70% and even 80% or 90%. The layer may even substantially consist of, or consist of, this material. "Substantially consist of" should be understood to mean that the layer may comprise impurities which have no influence on its properties. The terms "oxide" or "nitride" do not necessarily mean that the oxides or nitrides are stoichiometric. Indeed, they may be substoichiometric, superstoichiometric or stoichiometric.

The stack preferably comprises at least one layer based on a nitride. The nitride is particularly a nitride of at least one element selected from aluminum, silicon, zirconium, titanium. It may comprise a nitride of at least two or three of these elements, for example a silicon zirconium nitride or a silicon aluminum nitride. The layer based on a nitride is preferably a layer based on silicon nitride, more particularly a layer consisting substantially of a silicon nitride. When the layer of silicon nitride is deposited by cathode sputtering, it generally contains aluminum because it is common practice to dope silicon targets with aluminum in order to accelerate the deposition rates.

The layer based on a nitride preferably has a physical thickness in a range extending from 2 to 100 nm, particularly from 5 to 80 nm.

The layers based on nitride are commonly used in a large number of stacks of thin layers since they have advantageous blocking properties, in that they prevent the oxidation of other layers present in the stack, particularly functional layers which will be described below.

The stack preferably comprises at least one functional layer, particularly an electrically conductive functional layer. The functional layer is preferably included between two thin dielectric layers, at least one of which is a layer based on nitride. Other possible dielectric layers are for example layers of oxides or oxynitrides.

At least one electrically conductive functional layer is advantageously selected from:
- metal layers, particularly made of silver or niobium, or even gold, and
- layers of a transparent conductive oxide, particularly selected from indium tin oxide, doped tin oxides (for example doped with fluorine or antimony), doped zinc oxides (for example doped with aluminum or gallium).

These layers are particularly valued for their low emissivity, which gives the glazings excellent thermal insulation properties. In glazings equipping land vehicles, particularly motor vehicles, rail vehicles, or else aircraft or marine vessels, low-emissivity glazings make it possible, in hot weather, to outwardly reflect part of the solar radiation, and therefore to limit the heating of the passenger compartment of said vehicles, and where appropriate to reduce air-conditioning costs. Conversely, in cold weather, these glazings make it possible to retain the heat within the passenger compartment, and consequently to reduce the heating energy required. The same applies in the case of glazings equipping buildings.

According to a preferred embodiment, the stack of thin layers comprises at least one layer of silver, particularly one, two, three, or even four layers of silver. The physical thickness of the layer of silver or, where appropriate, the sum of the thickness of the layers of silver, is preferably between 2 and 20 nm, particularly between 3 and 15 nm.

According to another preferred embodiment, the stack of thin layers comprises at least one layer of indium tin oxide. The physical thickness thereof is preferably between 30 and 200 nm, in particular between 40 and 150 nm.

In order to protect the or each electrically conductive thin layer (whether metal or based on transparent conductive oxide) during the bending step, each of these layers is preferably surrounded by at least two dielectric layers. The dielectric layers are preferably based on oxide, nitride and/or oxynitride of at least one element selected from silicon, aluminum, titanium, zinc, zirconium, tin.

At least part of the stack of thin layers can be deposited by various known techniques, for example chemical vapor deposition (CVD), or by cathode sputtering, particularly magnetic-field-assisted (magnetron method).

The stack of thin layers is preferably deposited by cathode sputtering, particularly magnetron sputtering. In this method, a plasma is created in a high vacuum close to a target comprising the chemical elements to be deposited. By bombarding the target, the active species of the plasma tear off said elements, which are deposited on the glass sheet, forming the desired thin layer. This method is called a "reactive" method when the layer is made of a material resulting from a chemical reaction between the elements torn off from the target and the gas contained in the plasma. The major advantage of this method lies in the possibility of depositing a very complex stack of layers on the same line by making the glass sheet run in succession beneath various targets, generally in the same device.

The abovementioned examples have properties of electrical conduction and infrared reflection which are of use for providing a heating function (defrosting, defogging) and/or a thermal insulation function.

When the stack of thin layers is intended to provide a heating function, supplies of current must be provided. This may particularly be strips of silver paste deposited by screen printing on the stack of thin layers, at two opposite edges of the glass sheet.

The enamel layer is preferably formed from a composition comprising at least one pigment and at least one glass frit. The enamel layer preferably does not comprise lead oxide.

The enamel composition generally further comprises an organic medium, intended to facilitate the application of the composition on the substrate and also the temporary adhesion thereof to same, and which is eliminated during the firing of the enamel. The medium typically comprises solvents, diluents, oils and/or resins. In the present text, "enamel composition" is used to describe the liquid composition which is used to deposit a wet enamel layer on the glass sheet. The term "enamel layer" is used to describe the final layer, after firing, while the term "wet enamel layer" is used to describe the enamel layer before firing.

The enamel layer is preferably deposited by screen printing. To this end, a screen printing screen is placed on the glass sheet, which screen comprises meshes, some of which are blocked off, then the enamel composition is deposited on the screen, then a squeegee is applied in order to force the enamel composition through the screen in the zones where the screen meshes have not been blocked off, so as to form a wet enamel layer.

The deposition of the enamel layer comprises a firing step, preferably at a temperature of at least 600 and even 650° C., and of at most 700° C., preferably during a subsequent treatment for bending the glass sheet.

The pigments preferably comprise one or more oxides selected from oxides of chromium, copper, iron, manganese, cobalt, nickel. These may be, by way of example, copper and/or iron chromates.

In a preferred embodiment of the invention, the enamel layer is based on zinc borosilicate.

More particularly, the enamel layer advantageously has a chemical composition comprising the following oxides, in contents by weight which vary within the limits mentioned below:

| | |
|---|---|
| $B_2O_3$ | 2-20%, particularly 4-10% |
| $SiO_2$ | 20-45%, particularly 25-40% |
| $Bi_2O_3$ | 0 |
| ZnO | 8-25%, particularly 10-20% |

The composition advantageously comprises at least one alkali metal oxide, particularly potassium oxide, at contents of at most 5%, and/or sodium oxide, at contents ranging from 2 to 15%, particularly from 5 to 13%. The composition preferably contains titanium oxide ($TiO_2$) at contents ranging from 1 to 10%, particularly from 2 to 7%. The composition also comprises pigments, for example copper chromates. In this case, the typical contents of $Cr_2O_3$ and CuO range respectively from 8 to 20% and from 3 to 12%.

The chemical composition of the enamel can be determined by conventional chemical analysis methods, particularly from the fired enamel. This is therefore indeed the chemical composition of the fired enamel layer, and not of the glass frit which served to form the enamel.

The enamel layer is preferably opaque with a black hue. The lightness L* thereof, measured in reflection on the side of the glass, is preferably less than 5. As indicated above, it advantageously forms a strip at the periphery of the glass sheet. The enamel layer is thereby capable of hiding and protecting seals, connecting elements or else sensors from ultraviolet radiation.

The non-stick layer is preferably a layer based on refractory particles (particularly pigments) or a sol-gel layer. The non-stick layer preferably does not contain bismuth since it has been observed that the presence of bismuth could generate defects, even if the non-stick layer is not in contact with the stack of thin layers.

Refractory particles are intended to mean particles which do not undergo any transformation during the bending.

The refractory particles may for example be alumina particles. The refractory particles may advantageously be pigments.

The pigments preferably comprise one or more transition metal oxides, particularly selected from oxides of chromium, copper, iron, manganese, cobalt, nickel and titanium.

The pigments are preferably pigments of titanium oxide, which have excellent non-stick properties. Although these pigments are white (while the enamel is generally black), these pigments do not modify the appearance of the enamel viewed from the outside of the vehicle. When, in the final laminated glazing, the additional glass sheet or the lamination interlayer are tinted, the color imparted by these pigments is also not detrimental to the appearance viewed from the inside of the passenger compartment.

The layer based on pigments preferably comprises at least 40%, particularly at least 60%, or even at least 80% by weight, of pigments.

According to a preferred embodiment, the non-stick layer consists of pigments. These pigments are secured to the glass sheet by virtue of the underlying enamel layer: the softening thereof during the bending makes it possible to fix the pigments arranged thereabove.

According to another embodiment, the non-stick layer comprises pigments and vitreous binder. The vitreous binder does not comprise bismuth and may be based on the same glass frit as the underlying enamel. In order to obtain the non-stick property, the proportion by weight of pigment in the non-stick layer must be at least 40% by weight. A very simple means for obtaining this type of layers consists in adding a certain proportion of pigments to an enamel composition identical to that which served for depositing the underlying enamel layer.

According to yet another embodiment, the non-stick layer is a sol-gel layer. Sol-gel layer is intended to mean a layer obtained by a sol-gel method. The sol-gel layer is preferably based on silica.

A sol-gel method is a method wherein a sol containing precursors of the layer to be produced is deposited on the glass sheet by various means, such as spraying, curtain, laminar flow coating, roller, screen printing, etc. Deposition by screen printing is preferred here because it easily makes it possible to only deposit the sol-gel layer on a part of the glass sheet, in this instance only on the zone covered with enamel (and advantageously over all of this zone).

The sol preferably contains organometallic precursors of the layer to be produced, for example tetraethyl orthosilicate (TEOS). The layer is then generally dried then annealed in order to increase its density. The annealing preferably takes place during the same step as the firing of the enamel, therefore generally during the bending of the glass sheet.

The non-stick layer preferably has a thickness (particularly in the wet state) of between 5 and 100 µm. When the layer is based on refractory particles, the thickness thereof is preferably between 10 and 100 µm, particularly between 12 and 30 µm. When the layer is a sol-gel layer, the thickness thereof is preferably between 5 and 20 µm.

Preferably, the step of depositing the enamel layer and the step of depositing the non-stick layer are carried out by screen printing.

In the case in which the non-stick layer consists of pigments, the pigments are mixed with an organic medium which is then eliminated during the bending or during an optional pre-firing.

The step of depositing the enamel layer is preferably followed by a step of drying, typically at a temperature of between 100 and 200° C., before the deposition of the non-stick layer.

In the case of deposition by screen printing of a non-stick layer based on refractory particles, the latter must have a size which is compatible with the printing screen used. The particles preferably have a D90 of between 5 and 40 µm. The particle size distribution here is a distribution by volume, determined for example by laser particle size analysis.

The step of depositing the non-stick layer is preferably followed by a step of pre-firing, preferably at a temperature of between 150 and 600° C. Such pre-firing makes it possible to eliminate the organic medium, or generally any organic component optionally present in the layer.

A pre-firing step is usually carried out in the case of using enamels based on bismuth, in order to develop the non-stick properties of such an enamel by causing the partial crystallization thereof. Nevertheless, this step must be carried out at a high temperature, typically at least 500° C., while the pre-firing carried out in the context of the present method can advantageously be carried out at lower temperatures.

In the laminated bent glazing, the material according to the invention is adhesively bonded to an additional glass sheet by means of a lamination interlayer, such that the coatings face said interlayer. The coatings are preferably positioned on face 2 of the glazing, i.e. on the face of the glass sheet intended to be positioned outside the vehicle, facing the lamination interlayer.

The bending may particularly be carried out by gravity (with the glass deforming under its own weight) or by pressing, at temperatures ranging typically from 550 to 650° C. The glass sheets are preferably held apart by arranging an interlayer powder therebetween, providing a space of a few tens of micrometers, typically from 20 to 50 µm. The interlayer powder is for example based on calcium and/or magnesium carbonate.

During the bending, the interior glass sheet (intended to be positioned inside the passenger compartment) is normally placed above the exterior glass sheet. Thus, during the step of bending, the additional glass sheet is placed above the material according to the invention.

The step of lamination may be carried out by treatment in an autoclave, for example at temperatures from 110 to 160° C. and under a pressure ranging from 10 to 15 bar. Prior to the autoclave treatment, the air trapped between the glass sheets and the lamination interlayer can be eliminated by calendering or by applying negative pressure.

As stated above, the additional sheet is preferably the interior sheet of the laminated glazing, i.e. the sheet located on the concave side of the glazing, intended to be positioned inside the passenger compartment. Thus, the coatings are arranged on face 2 of the laminated glazing.

The additional glass sheet may be made of soda-lime-silica glass or else of borosilicate or aluminosilicate glass. It may be made of clear or tinted glass. Its thickness is preferably between 0.5 and 4 mm, particularly between 1 and 3 mm.

According to a preferred embodiment, the additional glass sheet has a thickness of between 0.5 and 1.2 mm. The additional glass sheet is particularly made of sodium aluminosilicate, preferably chemically reinforced. The additional glass sheet is preferably the interior sheet of the laminated glazing. The invention is particularly useful for this type of configuration for which it is difficult to arrange the stack of thin layers on face 3. The chemical reinforcement (also referred to as "ion exchange") consists in bringing the surface of the glass into contact with a molten potassium salt (for example potassium nitrate) so as to reinforce the surface of the glass by exchanging ions of the glass (in this case sodium ions) with ions having a larger ionic radius (in this case potassium ions). This ion exchange makes it possible to form compressive stresses at the surface of the glass and over a certain thickness. Preferably, the surface stress is at least 300 MPa, particularly 400 and even 500 MPa, and at most 700 MPa, and the thickness of the zone under compression is at least 20 µm, typically between 20 and 50 µm. The stress profile can be determined in a known way using a polarizing microscope fitted with a Babinet compensator. The chemical tempering step is preferably carried out at a temperature ranging from 380 to 550° C., and for a duration ranging from 30 minutes to 3 hours.

The chemical reinforcement is preferably carried out after the bending step but before the lamination step. The glazing obtained is preferably a motor vehicle windscreen, in particular a heating windscreen.

According to another preferred embodiment, the additional glass sheet carries, on the face opposite the face which is facing the lamination interlayer (preferably face 4, the additional sheet being the interior sheet), an additional stack of thin layers, particularly a low-emissivity stack, comprising a transparent conductive oxide, particularly indium tin oxide (ITO). The invention is also particularly useful for this type of configuration for which it is tricky to arrange the stacks of thin layers on both faces of the same glass sheet (face 3 and 4). In this embodiment, the lamination interlayer and/or the additional glass sheet is preferably tinted, the glass sheet carrying the coatings being able to be made of clear glass. The glazing obtained is preferably a motor vehicle roof.

As an example of the latter preferred embodiment, mention may be made of a laminated bent roof comprising, from the outside of the vehicle, a clear glass sheet coated on face 2 with a stack of thin layers comprising at least one silver layer then an enamel layer then a non-stick layer, a lamination interlayer made of tinted PVB, and an additional glass sheet made of tinted glass, carrying, on face 4, a low-emissivity stack of thin layers, particularly based on ITO.

The lamination interlayer preferably comprises at least one sheet of polyvinyl acetal, particularly polyvinyl butyral (PVB).

The lamination interlayer can be tinted or untinted in order, if necessary, to regulate the optical or thermal properties of the glazing.

The lamination interlayer may advantageously have acoustic absorption properties in order to absorb airborne or structure-borne sounds. To this end, it may particularly consist of three polymeric sheets, including two "external" PVB sheets surrounding an internal polymeric sheet, optionally made of PVB, with a lower hardness than that of the outer sheets.

The lamination interlayer may also have thermal insulation properties, in particular properties of infrared radiation reflection. To this end, it may comprise a coating of thin layers with low-emissivity, for example a coating comprising a thin layer of silver or a coating alternating dielectric layers with different refractive indices, deposited on an internal PET sheet surrounded by two external PVB sheets.

The thickness of the lamination interlayer is generally within a range extending from 0.3 to 1.5 mm, particularly from 0.5 to 1 mm. The lamination interlayer can have a smaller thickness on an edge of the glazing than at the center of the glazing in order to prevent the formation of a double image in the case of using a head-up display (HUD).

The example embodiments which follow illustrate the invention in a non-limiting manner.

Glass sheets 2.1 mm thick, coated beforehand by cathode sputtering of a stack of thin layers comprising two silver layers protected by zinc oxide layers, silicon nitride layers and NiCr blockers, were coated by screen printing with enamel layers with a wet thickness of 25 μm.

In the examples according to the invention, the enamel layer "E1" (enamel sold by Ferro under the reference 144011) was based on a zinc borosilicate frit (without bismuth) and black pigments based on oxides of chromium and copper.

In comparative examples, the enamel layer "E2" (enamel sold by Prince under the reference DV173770/N) was based on a bismuth zinc borosilicate frit and black pigments based on oxides of chromium and copper.

After drying at a temperature of 150° C., a non-stick layer of the following composition, according to the examples, was then deposited on the enamel layer by screen printing:

A1: pigments of $TiO_2$, wet thickness approximately 10 μm, having a D50 of the order of 3 to 5 μm and a D90 of the order of 10 μm.

A2: sol-gel silica, wet thickness of approximately 7 μm environ, deposited from a solution sold under the reference TLU0059B01 by Ferro A3: enamel layer E2, wet thickness 25 μm A4: mixture of 80% by weight of enamel E1 with 20% by weight of $TiO_2$ pigments, wet thickness of 10 μm.

The glass sheet thus coated was then subjected to a pre-firing treatment at 570° C. for 120 seconds.

An additional glass sheet, made of tinted glass 2.1 mm thick and covered on face 4 with a low-emissivity stack based on ITO, was then placed on the coatings side of the glass sheet. An interlayer powder providing a space of a few tens of micrometers, based on calcium carbonate, was inserted between the two glass sheets. The assembly was then subjected to a bending heat treatment at 600° C. for 480 seconds.

Table 1 below summarizes the results obtained, giving for each example (comparative examples C1 to C3 and examples 1 to 3 according to the invention) the nature of the enamel layer and of the non-stick layer (when it was present) and also the results in terms of appearance and bonding.

The appearance, more particularly the black color viewed from face 1, is evaluated by measuring the lightness L* in reflection (illuminant D65, reference observer 10°). The bonding is evaluated qualitatively by visual observation.

TABLE 1

| Example | C1 | C2 | 1 | 2 | C3 | 3 |
|---|---|---|---|---|---|---|
| Enamel | E2 | E1 | E1 | E1 | E1 | E1 |
| Non-stick layer | — | — | A1 | A2 | A3 | A4 |
| L* | 20 | <5 | <5 | <5 | 15 | <5 |
| Bonding | no | yes | no | no | no | no |

Comparative examples C1 and C2 do not use a non-stick layer. Example C1 shows that bismuth enamels, if they do not lead to bonding, do not make it possible to obtain the desired black hue, due to interactions between the enamel and the stack of thin layers during bending. The enamel without bismuth of comparative example C2 makes it possible to achieve the desired hue, but bonding between the two glass sheets is observed.

Comparative example C3 uses an enamel without bismuth in contact with the stack, topped with a bismuth enamel in contact with the additional glass sheet. Bonding is then prevented, but the presence of the bismuth enamel, even if it is not in contact with the stack of thin layers, degrades the appearance.

Examples 1 to 3 according to the invention show that the use of a non-stick layer in combination with an enamel without bismuth makes it possible to obtain both an absence of bonding and a satisfactory appearance.

The invention claimed is:

1. A laminated bent glazing, comprising:
a material comprising a glass sheet coated on at least part of one face thereof with a stack of thin layers, said stack of thin layers being coated on at least part of a surface thereof with an enamel layer not comprising bismuth such that said stack of thin layers is arranged between said face of the glass sheet and the enamel layer and the enamel layer is in contact with the stack of thin layers, said enamel layer being coated with a non-stick layer such that said enamel layer is arranged between said stack of thin layers and said non-stick layer;

an additional glass sheet, and a lamination interlayer, wherein the material is adhesively bonded to the additional glass sheet by the lamination interlayer such that the enamel layer and the stack of thin layers are facing said lamination interlayer and arranged between the glass sheet and the lamination interlayer.

2. The laminated bent glazing according to claim 1, wherein the stack of thin layers comprises at least one layer based on a nitride.

3. The laminated bent glazing according to claim 1, wherein the stack of thin layers comprises at least one functional layer.

4. The laminated bent glazing according to claim 1, wherein the enamel layer is based on zinc borosilicate.

5. The laminated bent glazing according to claim 1, wherein the enamel layer is opaque, has a black hue, and forms a strip at the periphery of the glass sheet.

6. The laminated bent glazing according to claim 1, wherein the non-stick layer is a layer based on refractory particles.

7. The laminated bent glazing according to claim 1, wherein the non-stick layer is a sol-gel layer.

8. The laminated bent glazing according to claim 1, wherein the additional glass sheet has a thickness of between 0.5 and 1.2 mm.

9. The laminated bent glazing according to claim 1, wherein the additional glass sheet carries, on the face opposite the face facing the lamination interlayer, an additional stack of thin layers.

10. The laminated bent glazing according to claim 2, wherein the at least one layer based on a nitride is a nitride of at least one element selected from aluminum, silicon, zirconium, titanium.

11. The laminated bent glazing according to claim 3, wherein the at least one functional layer is an electrically conductive functional layer.

12. The laminated bent glazing according to claim 11, wherein the at least one electrically conductive functional layer is selected from metal layers and layers of a transparent conductive oxide.

13. The laminated bent glazing according to claim 6, wherein the refractory particles are pigments.

14. The laminated bent glazing according to claim 7, wherein the sol-gel layer is a silica layer.

15. The laminated bent glazing according to claim 1, wherein the enamel layer and the stack of thin layers are on face 2 of the laminated bent glazing.

16. The laminated bent glazing according to claim 12, wherein the metal layers are silver or niobium layers and the layers of a transparent conductive oxide are selected from indium tin oxide, doped tin oxides, and doped zinc oxides.

17. A method for obtaining a laminated bent glazing according to claim 1, comprising:

providing said material and the additional glass sheet, then simultaneously bending the material and the additional glass sheet, then laminating said material with the additional glass sheet, by the lamination interlayer, such that the enamel layer and the stack of thin layers are facing said interlayer.

18. The method according to claim 17, further comprising:

providing the glass sheet coated on at least part of one of faces thereof with the stack of thin layers, then depositing, on the at least part of the surface of the stack of thin layers, the enamel layer not comprising bismuth, then depositing, on said enamel layer, the non-stick layer.

19. The method according to claim 18, wherein the depositing of the enamel layer and the depositing of the non-stick layer are carried out by screen printing.

* * * * *